United States Patent [19]

Solari et al.

[11] Patent Number: 5,617,576

[45] Date of Patent: Apr. 1, 1997

[54] METHOD OF SLOWING DOWN CODE EXECUTION IN A MICROPROCESSOR INCLUDING AN INTERNAL CACHE MEMORY

[75] Inventors: Edward L. Solari, Monmouth; Thomas A. Heckenberg, Forest Grove; Subbarao Vanka, Portland, all of Oreg.

[73] Assignee: Intel Corporation, Santa Clara, Calif.

[21] Appl. No.: 385,195

[22] Filed: Feb. 7, 1995

Related U.S. Application Data

[63] Continuation of Ser. No. 175,655, Dec. 29, 1993, abandoned.

[51] Int. Cl.[6] .................. G06F 9/00; G06F 13/00
[52] U.S. Cl. .................. 395/800; 364/DIG. 1; 364/DIG. 2; 364/229.5; 364/245.5; 364/246.91; 364/247.3; 364/251.7; 364/254.9; 364/255.1; 364/255.8; 364/242; 364/243
[58] Field of Search .................. 395/800; 364/DIG. 1, 364/DIG. 2, 229.5, 245.5, 246.91, 247.3, 251.7, 254.9, 255.1, 255.8, 243, 242

[56] References Cited

U.S. PATENT DOCUMENTS

| | | | |
|---|---|---|---|
| 4,631,702 | 12/1986 | Korba | 364/900 |
| 4,819,164 | 4/1989 | Branson | 364/200 |
| 4,835,681 | 5/1989 | Culley | 364/200 |
| 4,980,836 | 12/1990 | Carter et al. | 364/483 |
| 5,041,962 | 8/1991 | Lunsford | 364/200 |
| 5,065,313 | 11/1991 | Lunsford | 395/275 |
| 5,091,846 | 2/1992 | Sachs et al. | 395/250 |
| 5,125,088 | 6/1992 | Culley | 395/500 |
| 5,241,681 | 8/1993 | Hamid et al. | 395/800 |

*Primary Examiner*—Thomas G. Black
*Assistant Examiner*—Valerie Darbe
*Attorney, Agent, or Firm*—Blakely, Sokoloff, Taylor & Zafman

[57] ABSTRACT

An execution speed controller for controlling the effective processing rate of a microprocessor including an internal cache memory. In one embodiment, the execution speed controller monitors the activities of the microprocessor to determine when it is executing a section of code whose execution should be slowed. When such a determination is made, the execution speed controller periodically asserts at least one control input to the microprocessor. This periodically prevents the microprocessor from accessing the main memory and the internal cache memory, thereby slowing microprocessor execution. In this embodiment, only those software applications requiring slow down are effected. Newer software applications may not require this mode and may run at full speed. An alternate embodiment that does not require a triggering event is also described. In this embodiment, execution of all software applications is slowed down. This is referred to as the "compatibility" mode.

12 Claims, 7 Drawing Sheets

0
METHOD OF SLOWING DOWN CODE EXECUTION IN A MICROPROCESSOR INCLUDING AN INTERNAL CACHE MEMORY

This is a continuation of application Ser. No. 08/175,655, filed Dec. 29, 1993 and now abandoned.

FIELD OF THE INVENTION

The present invention relates to computer systems. More particularly, the present invention pertains to a method of slowing the execution Of a microprocessor including an internal cache memory.

BACKGROUND OF THE INVENTION

Most computer users wish to continue using the same applications software programs when they acquire a new personal computer that includes a faster microprocessor. That is to say, most personal computer users desire new microprocessors to provide backward compatibility with applications software programs designed for older, slower microprocessors. Providing backward compatibility is difficult when an applications program indirectly achieves interval timing by relying upon a minimum amount of time to execute a section of code. The problem is that the interval becomes shorter in duration when the section of code is executed by a faster microprocessor.

U.S. Pat. No. 5,041,962 to Lunsford for "Computer System with Means for Regulating Effective Processing Rates" discusses one solution to the problem of backward compatibility for a personal computer system that includes a local cache memory. Lunsford teaches achieving an effective processing rate that is less than the microprocessor's clock rate to provide backward compatibility. Lunsford uses a timer that periodically generates a FLUSH signal, which is coupled to the local cache memory. In response to the FLUSH signal, the entire contents of the cache memory are invalidated. This prevents the microprocessor from operating from the cache, which slows the microprocessor by forcing it to access the main memory. The microprocessor is also slowed down because it must rebuild the contents of the cache memory after the flush.

A disadvantage of the Lunsford method of regulating effective processing rate is that it cannot be used to achieve small, precise delays in the microprocessor's execution. Flushing write back cache memories causes imprecision because the number of lines that must be written back can vary. As a result, the time required to flush a write back cache is not constant. Rebuilding both write through and write back cache memories causes imprecision because the time required to rebuild a cache depends upon the code it stored.

Another disadvantage of Lunsford's method is the near negation of all benefits of a faster microprocessor by slowing its execution at all time, not just its execution of particular section of code within an applications program.

SUMMARY OF THE INVENTION

An object of the present invention is to provide a method of periodically halting microprocessor execution for small, precise periods of time.

Another object of the present invention is to provide a method of slowing microprocessor execution only when delay is critical to proper functioning of an applications program.

A still further object of the present invention is to provide a method of slowing the effective processing rate of a microprocessor that includes an internal cache memory.

An execution speed controller is described for controlling the effective processing rate of a microprocessor including an internal cache memory. In one embodiment, the execution speed controller monitors the activities of the microprocessor to determine when it is executing a section of code whose execution should be slowed. While that section of code is being executed, the execution speed controller periodically asserts at least one control input to the microprocessor. This periodically prevents the microprocessor from accessing the main memory and the internal cache memory, thereby slowing the effective execution speed of the microprocessor.

In an alternate embodiment, the execution speed controller slows microprocessor execution when placed in a deturbo mode. In this mode, the execution speed controller turns off the microprocessor's internal cache and then slows microprocessor execution by periodically preventing the microprocessor from accessing external memory.

Other objects, features, and advantages of the present invention will be apparent from the accompanying drawings and the detailed description that follows.

BRIEF DESCRIPTION OF THE FIGURES

The present invention is illustrated by way of example and not limitation in the figures of the accompanying drawings in which references indicate similar elements and in which.

DETAILED DESCRIPTION

Figure 1:
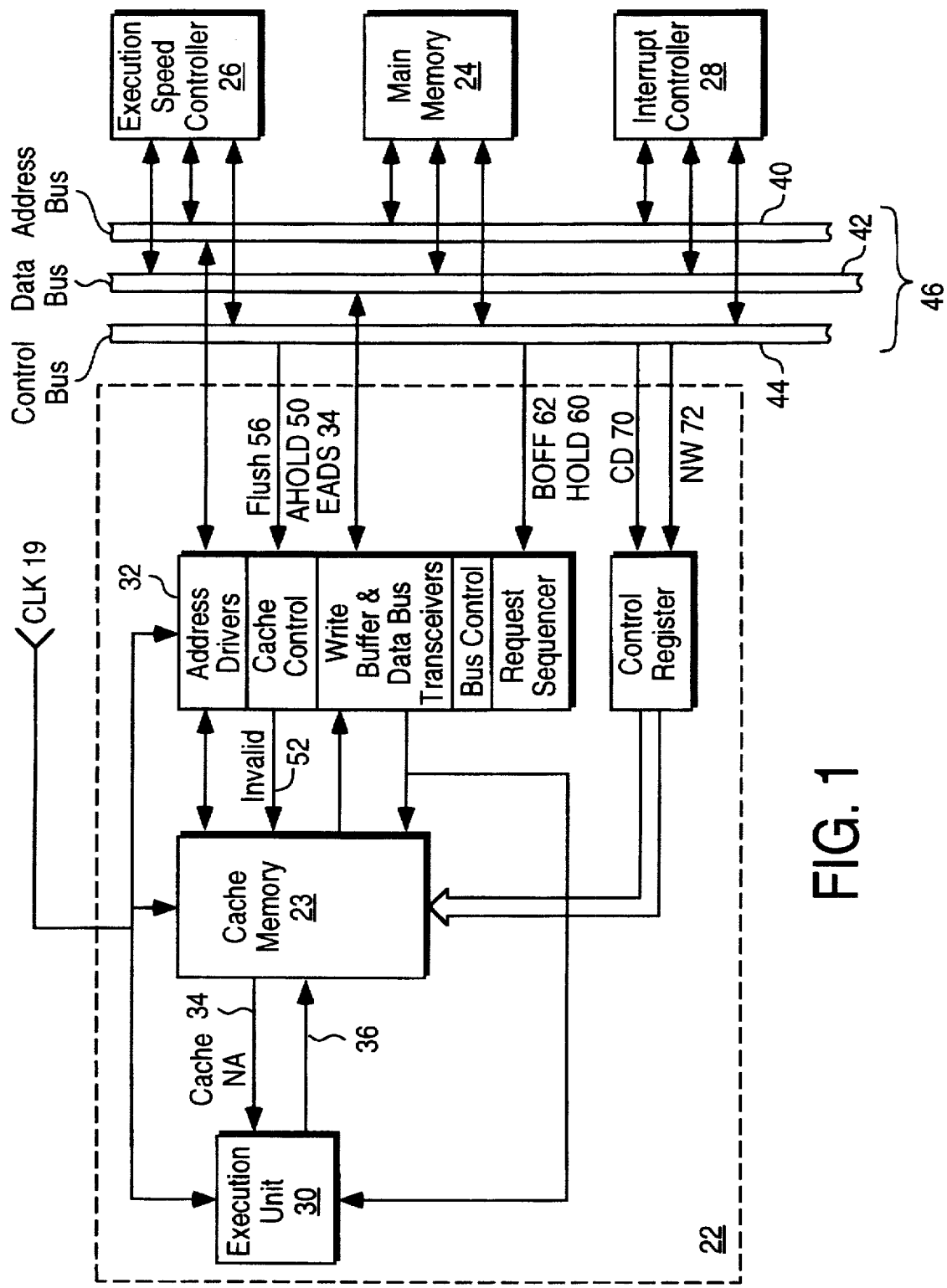
FIG. 1 is a block diagram of a computer system.

FIG. 1 illustrates in block diagram form personal computer 20. Personal computer 20 includes microprocessor 22, which includes internal cache memory 23, main memory 24 and execution speed controller 26. Execution speed controller 26 slows the execution speed of microprocessor 22. Briefly described, in a first embodiment controller 26 monitors the activities within personal computer 20 to determine when microprocessor 22 is executing a section of code within an application program whose execution should be slowed. When controller 26 makes such a determination it periodically asserts at least one control signal to temporarily prevent microprocessor access to main memory 24 and to internal cache memory 23. The control signals preferably represent an invalidation cycle and are accompanied by an invalidation address that is not stored within cache memory 23. As a result no data within cache memory 23 is invalidated as a result of the invalidation cycle. An alternate embodiment of execution speed controller 26 is also described, which does not require monitoring of activities within personal computer 20.

Prior to beginning a detailed discussion of controller 26, consider again microprocessor 22 and computer system 20 within which it operates. Microprocessor 22 may be realized using a microprocessor based upon the 486 architecture, a microprocessor based upon the architecture of the Pentium™ microprocessor manufactured by Intel Corporation of Santa Clara, Calif., or any microprocessor including an internal cache memory. Microprocessor 22 includes execution unit 30, cache memory 23 and bus interface 32 all of which are timed by clock input, CLK 19. Thus, CLK 19 controls the maximum execution speed of microprocessor 22.

Execution unit 30 may include an ALU, register files, a barrel shifter, a floating point unit, a segmentation unit, descriptor registers, a control unit, an instruction decoder and an instruction prefetcher, which are not illustrated. Execution unit 30 can execute instructions stored within cache memory 23 or within main memory 24. Execution unit 30 is able to access code and data stored within cache memory. 23 via bus 36 only when the cache is enabled and the cache not available signal, CACHENA 34, is not asserted. Execution unit 30 is able to access code and data stored within main memory 24 only while it is driving address bus 40 of bus 46. A number of control inputs can prevent microprocessor 22 from driving address bus 40, as will be described in more detail below. Execution unit 30 stops executing when it cannot access either cache memory 23 or main memory 24.

Cache memory 23 is a unified code and data cache, which operates in a number of modes. These modes of are described in Table I.

TABLE I

| Control Signals | | |
|---|---|---|
| CD | NW | Mode Description |
| 1 | 1 | Caching disabled, but valid lines continue to respond. |
| 1 | 0 | No new cache lines are allocated, but valid cache lines continue to respond. |
| 0 | 1 | Invalid mode. |
| 0 | 0 | Caching enabled. |

As indicated in Table I, control signals CD 70 and NW 72 select the mode of cache memory 23. The cache disable bit, CD 70, enables/disables cache line fills on cache misses. The no write bit. NW 72, enables/disables write throughs and invalidations. Cache memory. 23 can be turned off by setting CD 70 to a logic 1, NW 72 to a logic 1 and then invalidating the entire cache. This can be done via software commands, such as INVD or WBINVD, or by pulling FLUSH pin 56 active.

Cache memory 23 stores a multiplicity lines, each line including 16 or 32 bytes; however, the number of bytes in each line has no effect upon the present methods of slowing microprocessor execution speed. A valid bit is associated with each line to indicate whether the line is valid or not. Performing invalidation cycles allows the contents of cache memory 23 to remain consistent with that of main memory 24. As used herein, an invalidation cycle refers to informing microprocessor 22 of an access by another device to an address within main memory 24 so that microprocessor 22 can compare that address to the set of addresses currently stored within cache memory 23. If the address being accessed within main memory 24 is also stored as a line within cache memory 23 then that line will be invalidated by clearing its valid bit. Execution unit 30 does not use invalid lines of cache memory 23, retrieving the indicated data or code from main memory 24 instead.

Cache memory 23 asserts the cache not available signal, CACHENA 34, during cache invalidation cycles. As a result, execution unit 30 cannot access cache memory 23 during invalidation cycles, regardless of whether any line is invalidated or not. Nor can execution unit 30 access main memory 24 during cache invalidation cycles. This is because another device drives address bus 40 during invalidation cycles.

Other devices gain control of address bus 40 from microprocessor 22 by asserting the address hold input, AHOLD 50. Microprocessor 22 relinquishes control of address bus 40 by floating its address pins. In one embodiment, the cache control within bus interface 32 also responds to the assertion of AHOLD 50 by asserting the invalidation signal, INVALID 52. INVALID 52 controls the assertion of CACHENA 34 by cache memory 23. In other words, in one embodiment of the cache control assertion of AHOLD 50 is sufficient to prevent execution unit 30 access to both cache memory 23 and main memory 24. In another embodiment, the cache control does not respond to the assertion of AHOLD 50 by asserting INVALID 52. This improves microprocessor 22 performance by halting execution unit 30 only when there is a valid address on address bus 40. Thus, execution unit 30 can access cache memory 23 between assertion of AHOLD 50 and assertion of the external address strobe input, EADS 54. Assertion of EADS 54 indicates that there is a valid address on address bus 40. This embodiment of the cache control responds to the assertion of EADS 54 by asserting INVALID 52, which causes cache memory 23 to assert CACHENA 34.

The entire contents of cache memory 23 can be invalidated by asserting FLUSH input 56 to microprocessor 22. In response to an active FLUSH 56 all valid bits within cache memory 23 are cleared. While cache memory 23 is doing so, execution unit 30 is prevented from accessing cache memory 23 by the assertion of CACHENA 34. As a result, cache memory 23 must be at least partially, if not entirely, reloaded before it can be used, which requires a great deal of execution time from execution unit 30.

Bus interface 32 transfers all control, address and data signals between microprocessor 22 and bus 46, which includes address bus 40, data bus 42 and control bus 44. Inputs to bus interface 32 include AHOLD 50, EADS 54 and FLUSH 56, which have been previously discussed. Additionally, bus interface 32 receives control inputs HOLD 60 and BOFF 62. In the clock cycle following activation of HOLD 60, microprocessor 22 responds by floating nearly of all its input/output pins, thereby relinquishing control of bus 46 in favor of another device. Only HLDA is driven by microprocessor 22 after activation of HOLD 60, to indicate surrender of bus 46. Thus, active HOLD 60 prevents execution unit 30 from accessing main memory 24. Active HOLD 60 does not prevent execution unit access to cache memory 23. HOLD 60 is an alternate means of initiating a cache invalidation cycle. Microprocessor 22 responds to activation of backoff input, BOFF 62, by surrendering bus 46 immediately and immediately halting execution unit 30. This aborts whatever operation was in progress at the time.

Main memory 24 provides mass storage for personal computer 20, storing applications programs and data. Main memory 24 stores within its address space at least one applications program that includes at least one section of code designed to provide interval timing. That is to say, proper functioning of the applications program is based upon the assumption that execution of that section of code will take a set amount of time. However, execution unit 30 can execute the section of code in less than the set amount of time when it is stored in cache memory 23.

Main memory 24 can De realized using a variety of memory technologies, hard magnetic disk drives, floppy magnetic disk drives, static random access memories (SRAMs), dynamic random access memories (DRAMs), read only memories (ROMs), programmable ROMs (PROMs), erasable PROMs (EPROMs) and electrically erasable PROMs (EEPROMs).

Interrupt controller 28 provides central transmission of interrupt requests from hardware resources to microprocessor 22. Hardware resources can include input/output devices such as disk drives, printers, cursor control devices, printers and modems, for example, all of which are not illustrated in FIG. 1. Interrupt controller 28 may be implemented using an 8259 interrupt controller, which in manufactured by Intel Corporation of Santa Clara, Calif.

Execution speed controller 26 slows the execution by microprocessor 22 of a section of code that provides interval timing. In one embodiment, execution speed controller 26 does so by identifying when the section of code is being executed and then places personal computer 20 in deturbo mode. In deturbo mode execution unit 30 is periodically denied access to both cache memory 23 and main memory 24. This temporarily stops code execution. Preferably, execution speed controller 26 periodically prevents microprocessor access to main memory 24 and cache memory 23 by initiating an invalidation cycle.

Figure 2:
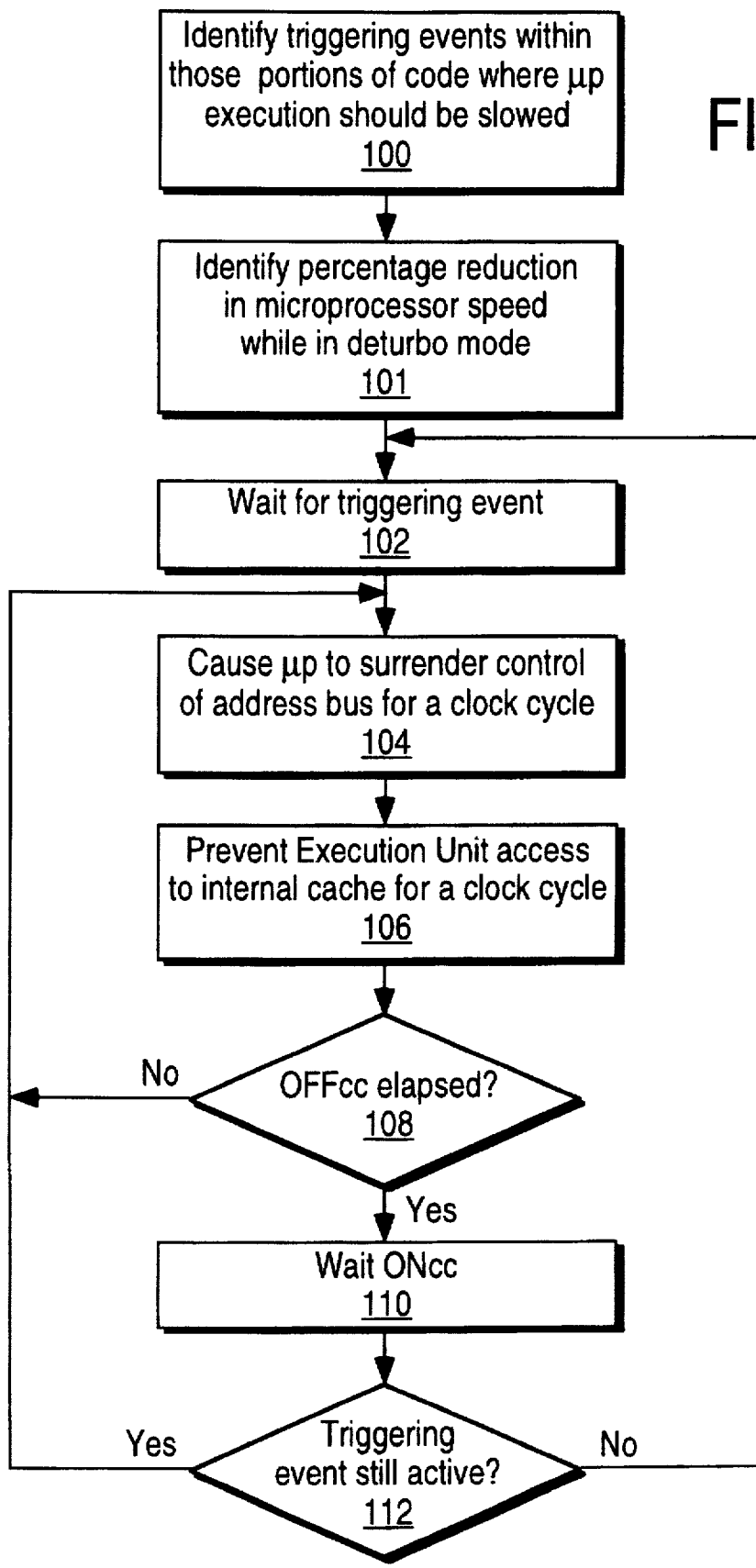
FIG. 2 is a flow diagram of one method of slowing microprocessor execution.

FIG. 2 illustrates in flow diagram a method implemented by execution speed controller 26 to slow the execution of a section of code by execution unit 30. First, in step 100, a triggering event for deturbo mode is identified within the section of code that is to be slowed down. A number of events can be selected to trigger deturbo mode, as will be described later. In step 101 the user indicates the desired execution rate of the microprocessor in deturbo mode. That rate, as compared to the normal execution rate, sets a deturbo duty cycle. That duty cycle can be expressed as:

$$\text{Deturbo duty cycle} = \frac{\text{Deturbo execution rate}}{\text{Normal execution rate}} = \frac{ON_{cc}}{ON_{cc} + OFF_{cc}}$$

where

Normal execution rate=Frequency of CLK $ON_{CC}$=number of clock cycles in which the microprocessor allowed to execute, $OFF_{CC}$=number of clock cycles in which microprocessor prevented from executing.

Execution speed controller 26 uses ONCC and OFFCC determine how frequently microprocessor execution should be stopped and for how many clock cycles, respectively.

Afterward, execution unit 26 awaits the occurrence of the triggering event in step 102. When the triggering event occurs, in step 104 execution speed controller 26 forces microprocessor 22 to surrender control of address bus 40 for a clock cycle by asserting one of the control inputs AHOLD 50, HOLD 60 or BOFF 62. In one embodiment of the cache control of bus interface, assertion of AHOLD 50 also prevents execution unit 30 access to cache memory 23, thereby temporarily halting execution of the section of code.

In this embodiment, execution unit 30 branches directly to step 108 from step 104. This is also the case if the asserted control input is BOFF 62, regardless of the embodiment of the cache control. In embodiments in which AHOLD 50 is asserted in step 104 and the cache control does not respond by inhibiting access to cache memory 23 by execution unit 30 then execution speed controller 26 branches to step 106 from step 104.

Execution speed controller 26 inhibits access to cache memory 23 by execution unit 30 for a clock cycle in step 106 by asserting the external address strobe input, EADS 34. During step 106 execution speed controller 26 also preferably drives an address onto bus 40 to prevent microprocessor 22 from doing so. Execution of the section of code is temporarily halted when CACHENA 34 is asserted.

Execution speed controller 26 determines in step 108 if execution unit 30 has been halted a sufficient number of clock cycles to achieve the desired execution rate. In other words, execution speed controller 26 determines whether microprocessor execution has been halted for OFFcc.

Figure 3A:
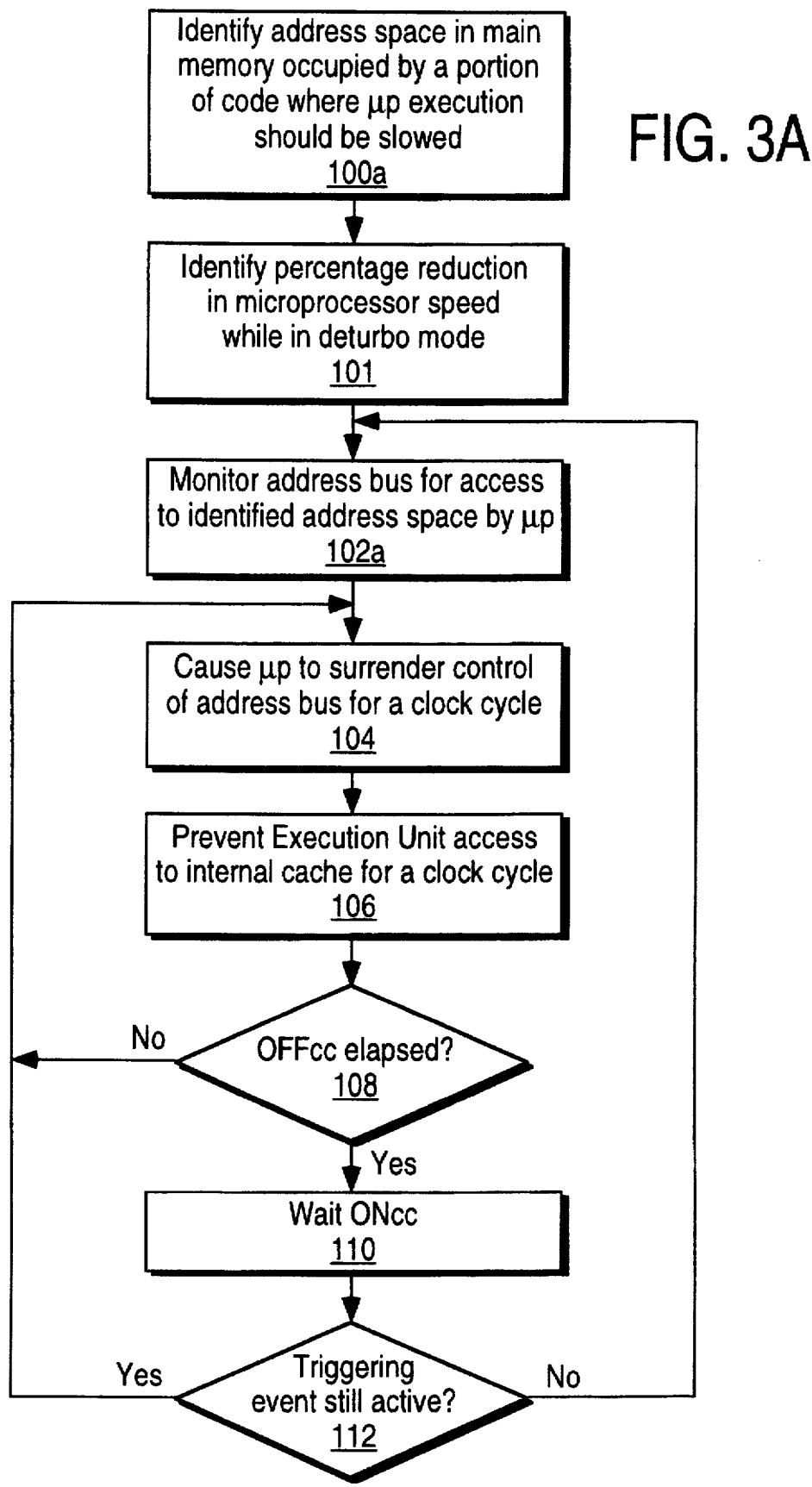
FIG. 3A is a flow diagram of one method of performing steps 100 and 102 of FIG. 2.
Figure 3B:
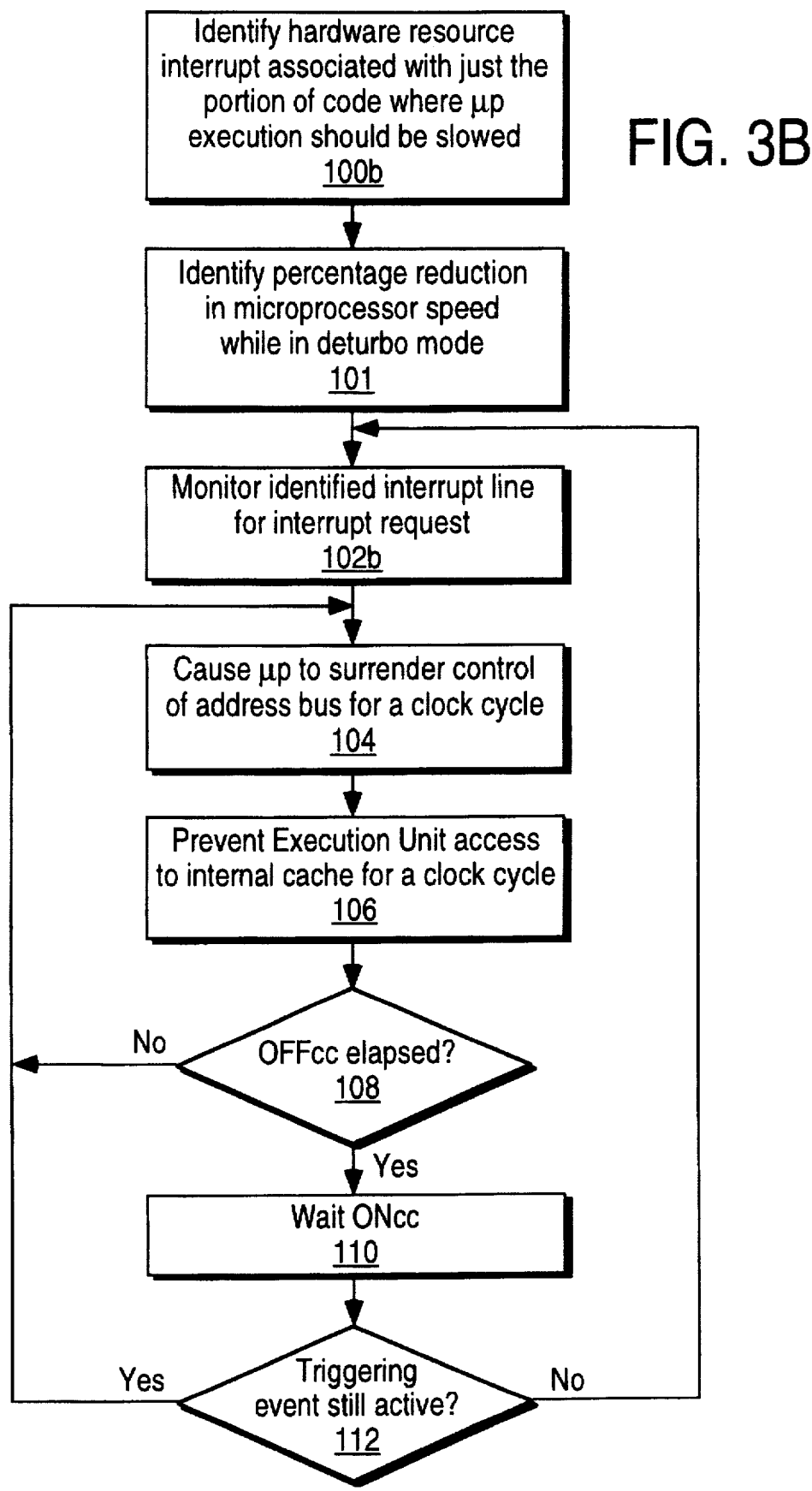
FIG. 3B is a flow diagram of a second method of performing steps 100 and 102 of FIG. 2.
Figure 3C:
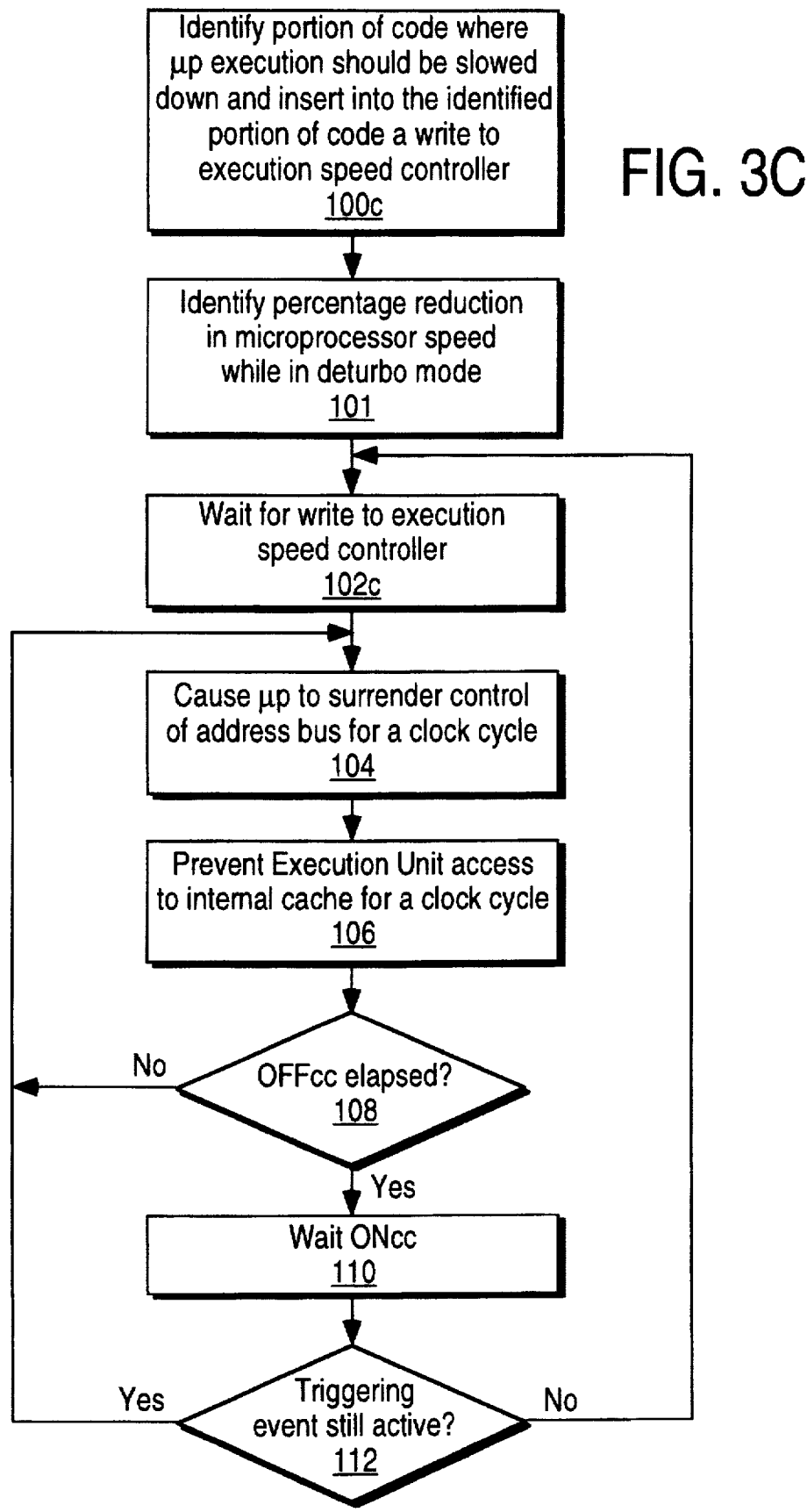
FIG. 3C is a flow diagram of a third method of performing steps 100 and 102 of FIG. 2.

FIGS. 3A, 3B and 3C illustrate three methods of implementing steps 100 and 102. The method chosen depends upon the particular section of code whose execution is to be slowed down. FIG. 3A illustrates address trapping, which will work with any section of code. In step 100a, the address space within main memory 24 occupied by the section of code whose execution should be slowed is identified. Thus, in step 102a execution speed controller 26 monitors address bus 40 awaiting access to that address space by microprocessor 22 in preparation of storing the section in cache memory 23 for execution. Execution speed controller 26 branches from step 102a to step 104 when it detects access to that address space by microprocessor 22.

FIG. 3B illustrates interrupt trapping, which may not be suitable for all applications programs. Interrupt trapping assumes that there is some hardware resource that requires interrupt handling only during the section of code that is to be slowed down. Thus, during step 102b execution speed controller 26 monitors the interrupt request input to interrupt controller 28 by that particular hardware resource. When the monitored interrupt request input becomes active, execution speed controller 26 branches from step 102b to step 104.

FIG. 3C illustrates yet another method of implementing steps 100 and 102. First, the section of code whose execution is to be slowed down is identified. Next, an instruction to write to a register within execution speed controller 26 is inserted into that section of code. During step 102c, execution speed controller 26 simply awaits a write to its register as a trigger for halting execution unit 30.

Figure 4:
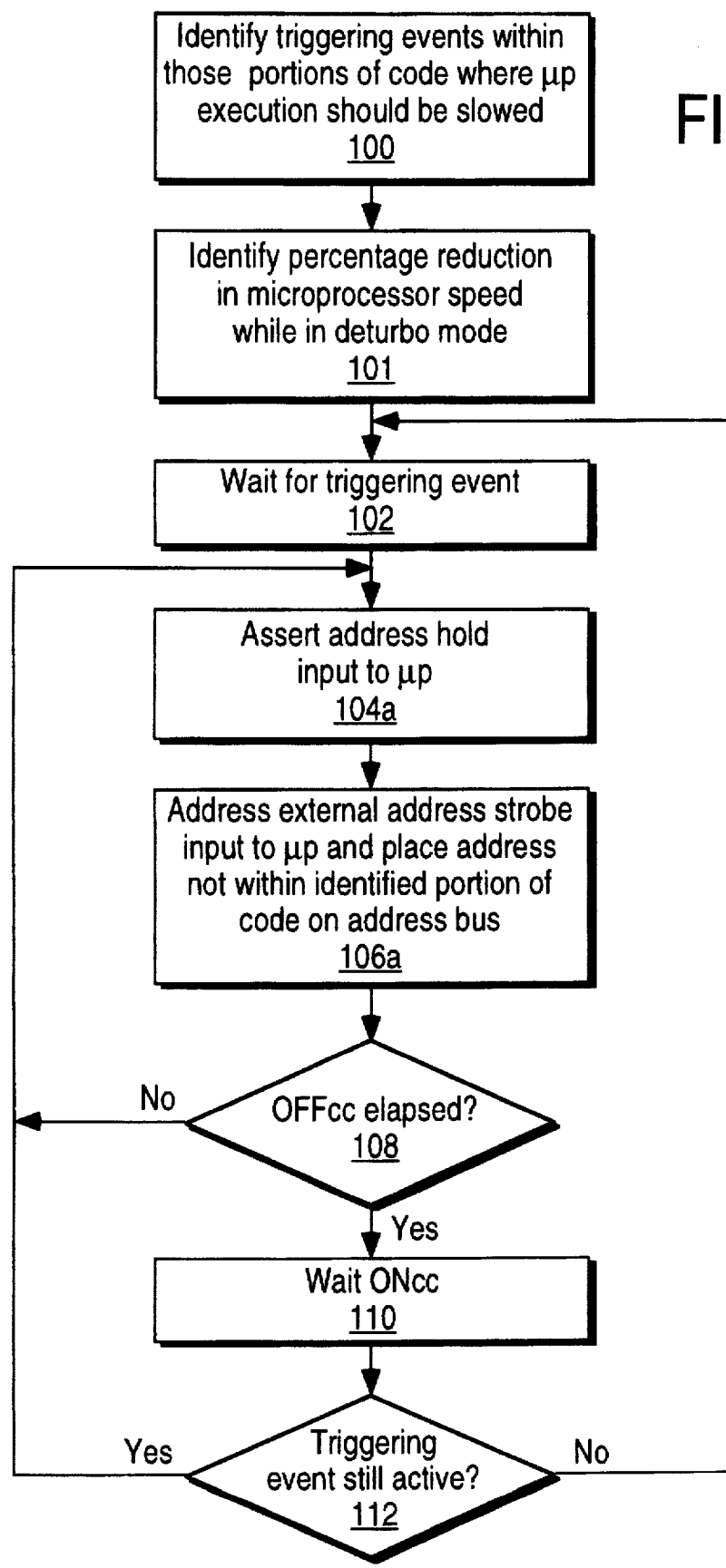
FIG. 4 is a flow diagram of a method of performing steps 104 and 106 of FIG. 2.

FIG. 4 illustrates in flow diagram form an invalidation cycle, which is the preferred method of implementing steps 104 and 106. Invalidation cycles associated with an address not stored within cache memory 23 are preferred because they are the least disruptive of execution unit 30 and cache memory 23. As a result, this method provides fine control the amount of time execution unit 30 is halted.

The invalidation cycle begins in step 104a. Execution speed controller 26 asserts AHOLD 50, signaling its desire to drive address bus 40 and preventing microprocessor 22 from doing so. Microprocessor 22 is unable to access main memory 24 as a result. Execution speed controller 26 then branches to step 106a to complete initiation of the invalidation cycle. The clock cycle after microprocessor 22 floats its address pins, execution speed controller 26 asserts EADS 34 and drives an invalidation address onto address bus 40. The invalidation address is preferably an address not within the address space currently cached by cache memory 23. As a result, the sole result of the invalidation cycle is to halt of execution unit 30 for a clock cycle.

Figure 5:
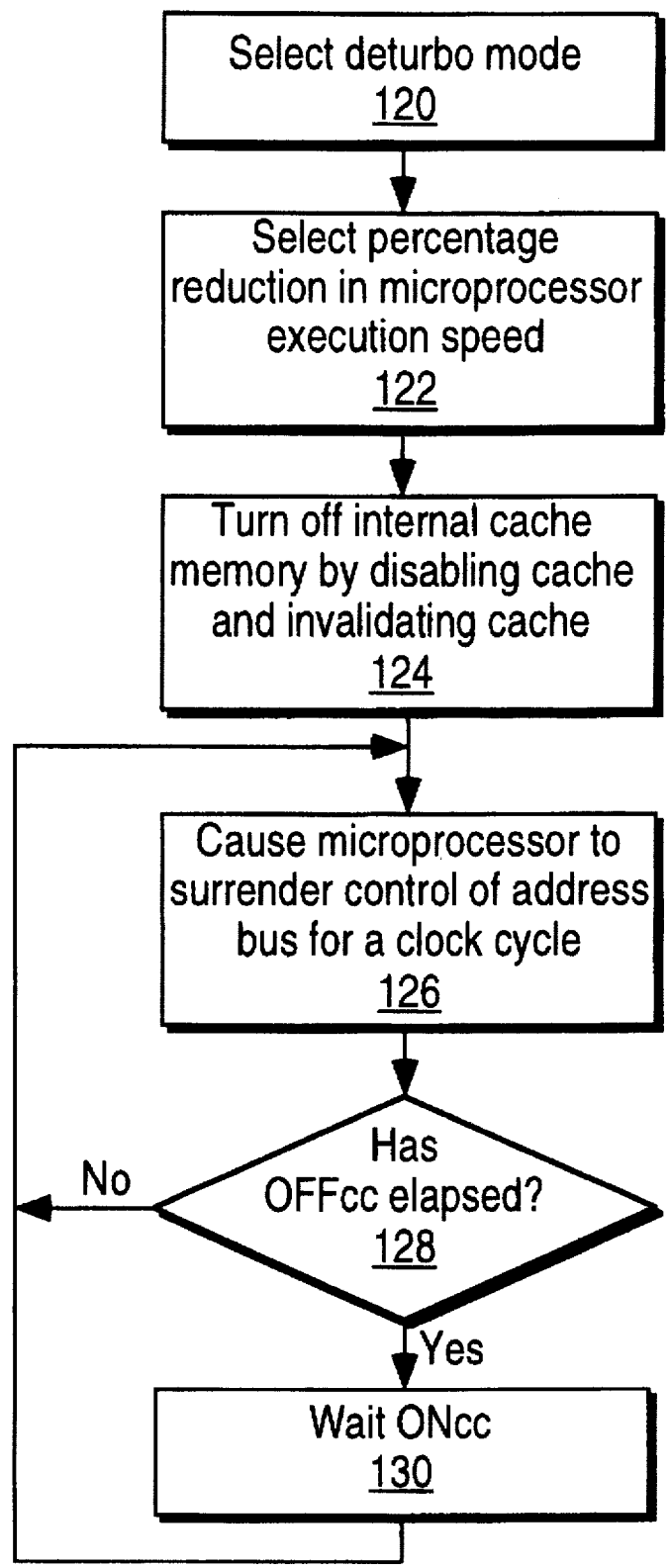
FIG. 5 is a flow diagram of an alternate method of slowing microprocessor execution speed.

FIG. 5 illustrates in flow diagram form an alternate method of slowing microprocessor execution speed to provide backward compatibility. This method differs from that of FIG. 2 in two respects. First, execution speed controller 26 need not monitor activities within personal computer 20 for triggering events. Instead, deturbo mode is triggered by the computer user. Once placed in deturbo mode, the execution speed of microprocessor 22 is slowed regardless of the software being executed. Second, internal cache memory 23 is turned entirely, rather than periodically preventing access to it by execution unit 30.

A user of personal computer 20 places it in deturbo mode in step 120 by entering the personal computer's set-up utility program and selecting deturbo mode. In response, the set-up utility enables execution speed controller 26. Preferably, the set-up utility program does so by writing a bit to a register within controller 26. Additionally, in step 122 the user indicates the desired execution speed of microprocessor 22 in deturbo mode using the set-up utility program. As discussed previously with respect to step 101, this defines how frequently microprocessor execution is halted and for how many clock cycles.

Execution speed controller 26 responds to initiation of the deturbo mode in step 124 by turning off internal cache memory 23. This slows the execution of code by microprocessor 22 because it must use external memory as a code store. Execution speed controller 26 turns off cache memory 23 by setting both the cache disable bit, CD 70, and the no write bit, NW 72, to a logic 1. Execution speed controller 26 then invalidates all lines within cache memory 23. Execution speed controller 26 may do so by bringing FLUSH 56 active or using the microprocessors invalidate commands.

After cache memory 23 is turned off, slowing the execution speed of microprocessor 22 requires periodically halting its execution by periodically preventing its access to its code store. Execution speed controller 26 does so in steps 126, 128 and 130 by periodically forcing microprocessor 22 to surrender control of address bus 40. Steps 126, 128 and 130 conceptually correspond to steps 104, 108 and 110 and will not be described in greater detail.

Computer system 20 continues branching through steps 126, 128 and 130 until the user returns to the set-up utility program and turns the deturbo mode off.

Execution speed controller 26 may be implemented using random logic, a programmable logic array (PLA) or a gate array application specific integrated circuit (ASIC).

Thus, methods of slowing the execution speed of a microprocessor to provide backward compatibility have been described. Microprocessor execution of the section of code is slowed by periodically preventing the microprocessors execution unit from accessing both the internal cache memory and the main memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of slowing the execution of a sequence of instructions contained in a designated section of address space in a computer system having a microprocessor, a main memory and an address bus coupling the microprocessor to the main memory, the main memory including the designated section of address space, the computer system also including at least one control line which is used to prevent access to the main memory and coupled to the microprocessor and the computer system also including an execution speed controller coupled to the address bus and the control line, comprising the steps of:

a) identifying a percentage reduction in microprocessor speed represented by a number of clock cycles defining a period during which the microprocessor is stalled; and b) configuring the execution speed controller with the number of clock cycles defining the period during which the microprocessor is stalled.

c) examining the address bus to identify a predetermined address associated with the designated section of address space;

d) providing at least one control signal on the control line in response to identifying the predetermined address; and e) using the control signal to slow the execution by the microprocessor of the sequence of instructions stored within the designated section of address space.

2. The method of claim 1 wherein the control signal is a HOLD signal and the control line is a HOLD control line.

3. The method of claim 2 wherein step e) also includes the steps of:

asserting the HOLD signal for the number of clock cycles defining the period during which the microprocessor is stalled; and releasing the HOLD signal.

4. The method of claim 3 further including the steps of:

receiving the HOLD signal, thereby preventing the microprocessor from accessing the address bus, thus stalling the microprocessor until a release of the HOLD signal; and continuing to monitor the microprocessor by returning to the examining step.

5. A method of slowing the execution of a designated section of code in an application program in a computer system having a microprocessor with an internal cache memory, a main memory, and an address bus coupling the microprocessor to the main memory the main memory storing the designated section of code, the computer system also having a first control line which is used for preventing access to the main memory and which is coupled to the microprocessor, a second control line which is used for executing cache invalidation cycles and which is coupled to the microprocessor, the cache invalidation cycles preventing the microprocessor from accessing the internal cache memory and the main memory; the computer system further comprising an execution speed controller coupled to the address bus and at least one control line, comprising the steps of:

a) identifying a percentage reduction in microprocessor speed represented by a number of clock cycles defining a period during which the microprocessor is stalled; and b) configuring the execution speed controller with the number of clock cycles defining the period during which the microprocessor is stalled.

c) examining the address bus to identify a predetermined address associated with the designated section of code in the application program;

d) providing a first and second control signal on the first and second control lines, respectively, when the predetermined address has been identified; and e) using the first and second control signals to slow the execution of the designated section of code in the application program by the microprocessor preventing access to the internal cache memory and the main memory.

6. The method of claim 5 wherein the first control signal indicated in step d) is an AHOLD signal which is applied to the first control line, and the second control signal is an EADS signal which is applied to the second control line.

7. The method of claim 6 wherein step e) further includes the steps of:

using the AHOLD signal to cause the microprocessor to relinquish the address bus;

using the EADS signal to indicate that a valid external address is present the address bus;

causing the microprocessor to perform at least one invalidation cycle, preventing the microprocessor from accessing the internal cache memory and the main memory, thus forcing the period during which the microprocessor is stalled; and continuing to monitor the microprocessor by returning to the examining step.

8. The method of claim 7 wherein the valid external address is driven onto the address bus by the execution speed controller.

9. A method of slowing the execution of a designated section of code in an application program in a computer system having a microprocessor with an internal cache memory, a main memory, and an address bus coupling the microprocessor to the main memory, the main memory storing the designated section of code, the computer system also having at least one first control line which is used for preventing access to the main memory and which is coupled to the microprocessor, at least one second control line which is used for executing cache invalidation cycles and which is coupled to the microprocessor, the cache invalidation cycles preventing the microprocessor from accessing the internal cache memory and the main memory, the computer system further including an interrupt control and a multiplicity of hardware resources, each hardware resource generating first interrupt signals, the first interrupt signals being coupled to the interrupt controller, the interrupt controller coupling a master interrupt signal to the microprocessor; the computer system further comprising an execution speed controller coupled to the address bus and at least one control line; comprising the steps of:

a) identifying a percentage reduction in microprocessor speed represented by a number of clock cycles defining a period during which the microprocessor is stalled; and b) configuring the execution speed controller with the number of clock cycles defining the period during which the microprocessor is stalled.

c) examining the first interrupt signals to identify a predetermined interrupt signal;

d) providing a first and second control signals on the first and second control lines respectively, when the predetermined interrupt signal has been identified; and e) using the firsts and second control signals to slow execution of the designated section of code by the microprocessor by preventing access to the internal cache memory and the main memory.

10. The method of claim 9 wherein the first control signal indicated in the providing step is an AHOLD signal which is applied to the first control line, and the second control signal is an EADS signal which is applied to the second control line.

11. The method of claim 10 wherein the using step further includes the steps of:

using the AHOLD signal to cause the microprocessor to relinquish the address bus;

using the EADS signal to indicate that a valid external address is present on the address bus;

causing the microprocessor to perform at least one invalidation cycle, preventing the microprocessor from accessing the internal cache memory and the main memory, thus forcing the period during which the microprocessor is stalled; and continuing to monitor the microprocessor by returning to the examining step.

12. The method of claim 11 wherein the valid external address is driven onto the address bus by the execution speed controller.

\* \* \* \* \*

UNITED STATES PATENT AND TRADEMARK OFFICE
CERTIFICATE OF CORRECTION

PATENT NO. : 5,617,576
DATED : April 1, 1997
INVENTOR(S) : Solari et al.

It is certified that error appears in the above-identified patent and that said Letters Patent is hereby corrected as shown below:

In column 5 at line 9 delete "De" and insert --be--

In column 9 at line 3 insert --by-- following "microprocessor" and prior to "preventing"

In column 10 at line 17 delete "firsts" and insert --first--

Signed and Sealed this

Twenty-third Day of September, 1997

Attest:

BRUCE LEHMAN

*Attesting Officer*   Commissioner of Patents and Trademarks